United States Patent [19]

Formanski

[11] 3,930,595
[45] Jan. 6, 1976

[54] ARTICLE FEEDING DEVICE
[75] Inventor: Joseph J. Formanski, Whitmore Lake, Mich.
[73] Assignee: Michigan Automation Company, Inc., Detroit, Mich.
[22] Filed: Jan. 20, 1975
[21] Appl. No.: 542,305

[52] U.S. Cl. .............................................. 221/212
[51] Int. Cl.² ...................................... B65G 59/04
[58] Field of Search ...... 198/41; 221/167, 160, 161, 221/212

[56] References Cited
UNITED STATES PATENTS
3,448,894    6/1969    Modrey et al. ................. 221/212 X Primary Examiner—Stanley H. Tollberg

[57] ABSTRACT

A machine that constantly feeds essentially small magnetizable parts or hardware one or a few at a time to an orienting device, chutes or other equipment for use in manufacturing or assembly operations is disclosed. The machine translates these parts from the upper border or edge of a mass of such parts.

15 Claims, 5 Drawing Figures

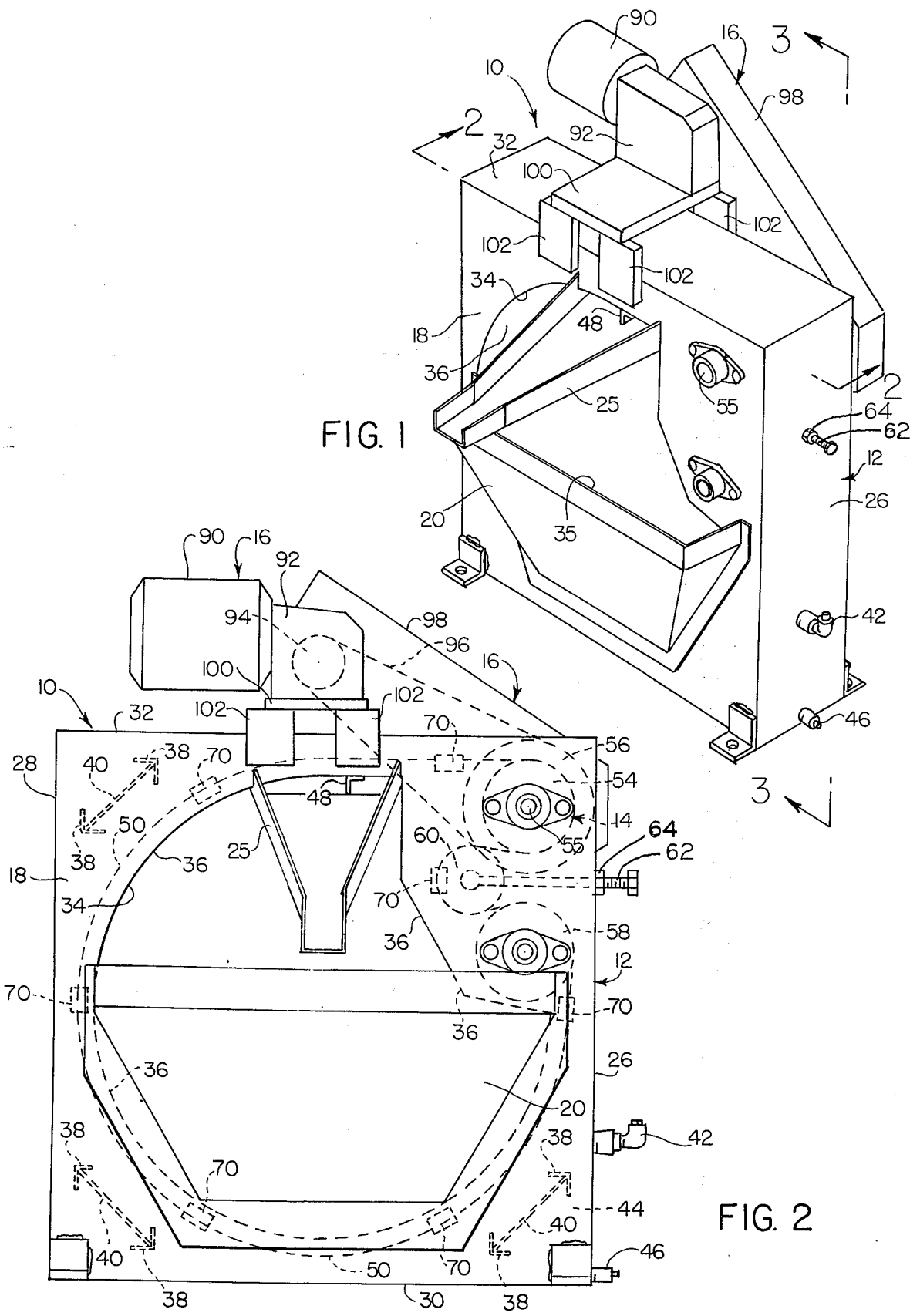

ARTICLE FEEDING DEVICE

The article feeding device of this invention is provided with means to receive a plurality of magnetizable unitary small parts, hardware, assemblies or units charged into a storage chamber of the machine, whereby the parts build up into a mass or burden. The parts may be delivered to the storage chamber singly, in groups or in bulk or large mass, dependent upon the method of translating such parts in any particular application.

Magnetic means is used to remove the parts from the mass in the storage chamber, the unique feature of such translation or removal being that the parts will be taken by magnetic force from the upper border or edge of the mass or burden, thereby effecting considerable advantages over magnetic-type devices currently in use. Magnets attached to supporting means are translated by roller chain mechanism behind a nonmagnetizable stationary surface plate upon which the parts are stored and at rest. As the magnets move adjacent but spaced from these parts, the magnetic force applied to the parts picks up those that are at or adjacent the upper border and lateral edge of the burden so that only those parts will be caused to move within the magnetic field and slide upon the surface plate to a position at which they are discharged from the machine. At that point, removal by gravity force onto a track, orienting device, chute or other means will place the parts in the desired posture for further operations or for collection, packing and/or storage, or other desired state.

Although magnetic-type conveyors have been in commercial and industrail use for a long time, whereby parts are translated from one position to another, it is believed that this is the first instance in which magnet means has been so arranged in relationship to a mass or burden of magnetizable units that they are removed substantially one at a time or in very small number from and closely adjacent the upper border and lateral edge of a mass or burden of such parts.

A major advantage of the article feeding device of this invention over conventional bowl or barrel feeders is that only the part(s) being removed from the upper lateral edge of a mass or burden are translated to discharge, and therefore no movement of parts relative to each other occurs in any other portion of the mass. This factor is important in maintaining sharp edges on the parts, and eliminating nicks and marks that result from the parts abrading or moving against each other in the mass. Because there is no rotation or movement of a mass of parts simultaneously throughout, the noise level incident to rotating barrels or vibrating bowls is absent. Down time for refilling the feeder device is reduced or eliminated by automatically charging such parts into the storage chamber of the machine or by providing a chamber sufficiently large so that a lesser number of refillings is required. The machine of this invention will completely empty itself, avoiding a product mix which sometimes occurs with other magnetic-type feeding devices. Of course, where parts are of such configuration that they are difficult to handle and tend to engage, tie, link or lock onto one another, vibratory aids may be added to the storage chamber as a means of eliminating bridging or hanging-up of such parts. Alternatively, a vibratory probe may be inserted into the mass or burden of such parts in the chamber, whereby their locking or engagement will be substantially reduced or eliminated.

It is therefore a principal object of the invention to provide magnetic means for translating magnetizable parts, heaped in a mass in a storage chamber, substantially one or a few at a time from such mass adjacent and at the upper border or edge of such mass, whereby the mass is reduced without causing the parts to tumble over or abrade each other. Another object is to provide magnetic means for translating such parts one or a few at a time from the burden in a refillable storage chamber or hopper, by causing the parts to move upon a nonmagnetizable surface or face plate to a stop or discharge position, whereat the parts are caused to fall by gravity onto other orienting or translating means. A further object is to provide magnetic force applying means arranged in an endless series for translation of parts upon the non-magnetic face plate or surface one or a few at a time. Yet another object is to provide power drive means for the endless series of magnetic force applying means mounted upon a housing including a storage chamber for such parts and forming a compact unitary article feeding device.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which FIG. 1 is a perspective view of a preferred embodiment of the invention.

FIG. 2 is a front elevational view of the device illustrated in FIG. 1, taken substantially on the line 2—2 of FIG. 1.

Figure 3:
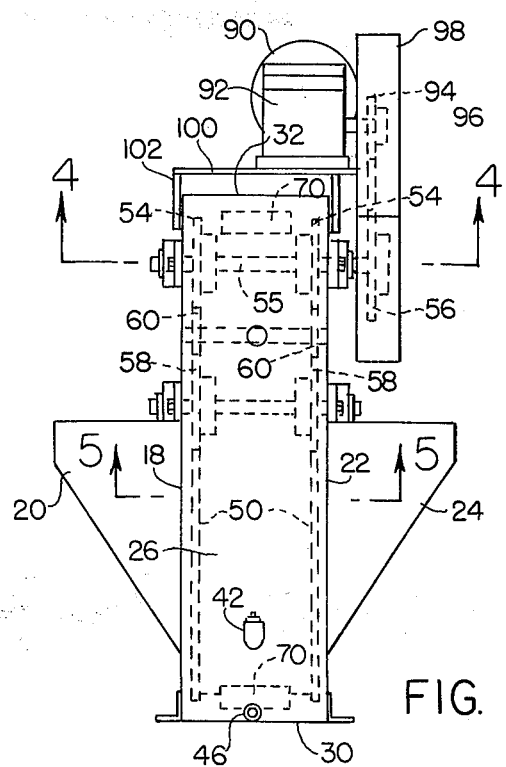
FIG. 3 is a side elevational view of the device illustrated in FIG. 1, taken substantially on the line 3—3 of FIG. 1.

As shown in the several views of the drawings, a preferred embodiment of the invention is the article feeding device 10 comprising the housing 12, a chain-type endless magnetic parts translation mechanism 14, and a motor-operated drive mechanism 16 for the translation system.

The housing 12 comprises a front wall 18 having a hopper chute 20 mounted thereon, a rear wall 22 with a hopper chute 24 mounted thereon, and end wall panels 26, 28, a bottom wall 30 and a top plate 32 connected to the front and rear walls and forming a chamber 35 therewithin. The front and rear walls 18 and 22 have portions thereof cut out to provide openings 34, 34 therethrough above and adjacent the hopper chutes 20, 24, whereby transverse orienting or feeding means 25, operated mechanically or by gravity, can be inserted through such openings to receive the parts discharged by the translation system 14, as will be more particularly described below.

The transverse orienting or feeding means 25 is optionally, as shown, secured to the front and/or rear walls 18, 22, and extends substantially transversely through an opening 34.

The housing is further provided with a non-magnetic face or surface plate member 36 that is connected to and extends from and between the front and rear walls 18,22. The face plate may be made of stainless steel, manganese, or other suitable materials, including the high molecular weight polyesters or other suitable plastics. The plate member 36 forms a storage chamber 35 with the front and rear walls and their hopper chutes from which the parts are translated upon the plate member to the orienting device 25. The bottom and sides of the chamber 35 are defined by the plate member 36 secured at its lateral edges to the front and rear walls 18,22. To strengthen the housing at its corners, angles and tie plates 38,40 respectively are secured by welding to the front and rear plates 18,22, as shown particularly in FIG. 2.

An internal oil-type lubrication system for the translation mechanism 14 is provided by an inlet fill member 42 connected to and communicating through an opening in the end wall plate 26 with the housing lower chamber portion 44, lubricant being introduced through the inlet member to a level substantially up to or adjacent the inlet opening. A lubricant drain member 46, communicating with the lower chamber portion 44 through an opening in the end wall 26, is also provided. The roller chain and magnet portions of the translation mechanism 14 are continuously lubricated by the oil bath in chamber 44, thus keeping its maintenance to a minimum.

The chain-type magnetic parts translation mechanism 14 comprises the endless link drive chain members 50,50, a drive sprocket assembly 52 having a pair of internal sprockets 54,54 mounted on a shaft 55 and engaging the members 50,50. The shaft 55 extends beyond the rear wall 22 and supports an external driven sprocket 56 engaged by the motor-operated drive mechanism 16. A second pair of internal sprockets 58,58 engage the members 50,50, and a pair of idler take-up sprockets 60,60 also engage the members 50,50 for adjusting the tension on the chain drive members by threadedly adjusting the take-up rod 62 upon the nuts 64 supporting the rod upon the end wall plates 26. The sprockets 54,54, 60,60 and 58,58 are mounted in pairs upon their shafts which are supported in end bearings affixed to the front and rear walls 18,22 of the housing.

Figure 4:
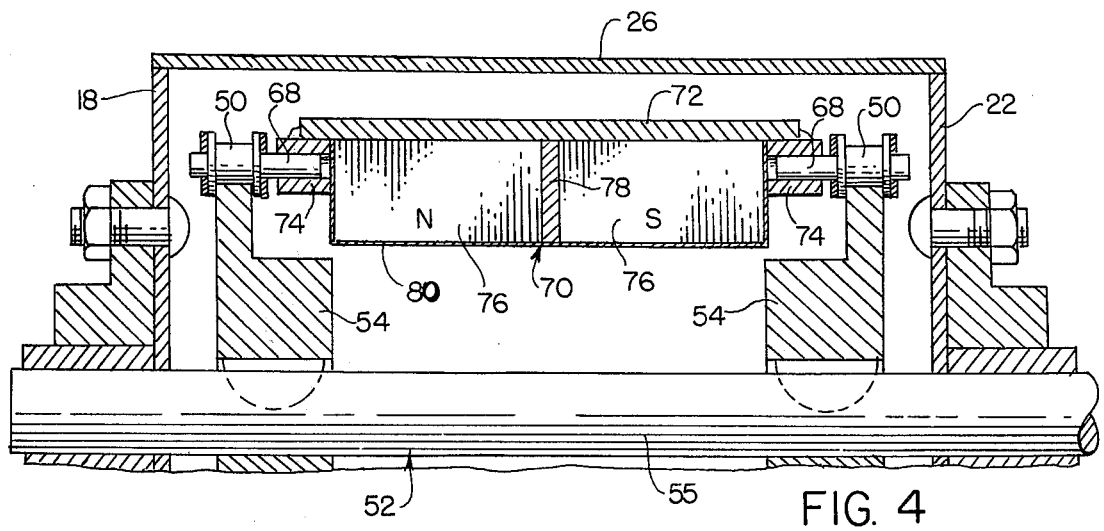
FIG. 4 is a transverse horizontal sectional view, taken substantially on the line 4—4 of FIG. 3.
Figure 5:
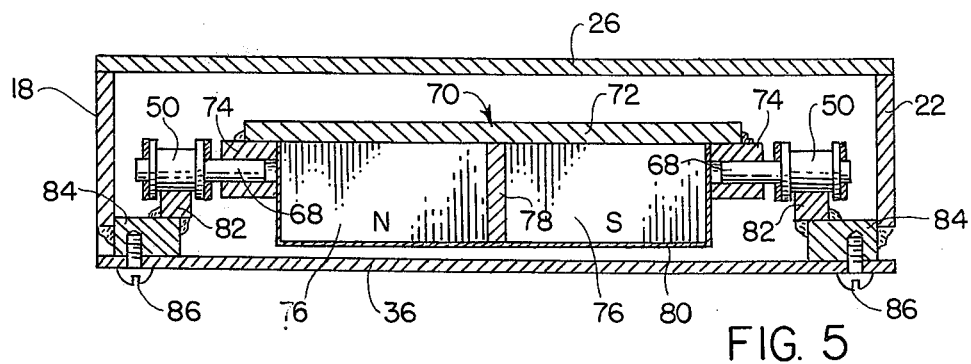
FIG. 5 is a transverse horizontal sectional view, similar to that illustrated in FIG. 4, taken substantially on the line 5—5 of FIG. 3.

As shown particularly in FIGS. 2, 4 and 5, the endless link drive chain members 50,50 are provided, at selected positions in the chains, with transverse link stub shafts 68,68 that extend inwardly of the links to support magnet members 70 spaced apart longitudinally of said chain members in substantially equidistant relationship. The magnet members 70 comprise a magnetizable backbar 72 having end bearings 74,74 supported upon the chain link stub shafts 68,68, a pair of magnets 76,76 (or alternatively, a single unitary magnet for some applications) of rectilinear or other suitable configuration and of opposite polarity secured by magnetic influence and force upon the support plate 72 and extending forwardly therefrom toward and relatively closely adjacent but spaced slightly apart from the non-magnetic face or surface plate 36 in their course thereabout. The magnets 76,76 are spaced laterally apart from each other by the non-magnetic spacer 78 and are encased within a non-magnetic housing or covering 80 of stainless steel.

The link drive chain members 50,50 and their magnet units 70 are slidingly supported upon track or guide strips 82,82 in turn fixedly secured to lateral support members 84,84 affixed to the front and rear wall plates 18, 22. The nonmagnetic surface plate 36 is affixed by suitable fasteners 86 to the support members 84,84. In the region where the guide strips 82,82 are not provided, i.e., adjacent the sprockets, the link drive chain members 50,50 are engaged by and supported upon the teeth of the sprockets 54,54, 60,60 and 58,58.

The motor-operated drive mechanism 16 comprises an electrically operated motor 90, a conjoined speed reducer device 92 having an output shaft mounting a drive pulley 94 connected by a belt 96 to the driven pulley 56 mounted on the outboard end of the shaft 55 supporting the chain drive sprockets 54,54. The speed reducer 92 and connected motor are affixed to a supporting plate 100 having depending legs 102,102 fixedly attached and secured to the front and rear walls 18, 22 (FIGS. 2 and 3).

In operation, the article feeding device 10 performs in the following manner. When the electrically operated motor 90 is actuated, the drive belt system components 94, 96, and 56 set in motion the chain-type magnetic parts translation mechanism 14 so that the endless link drive chain members 50,50 with their attached magnet units 70, driven by the drive sprockets 54,54, commence a course through the housing between the front and rear walls 18, 22, so that the magnets 76,76 are caused to pass closely behind the face or surface plate 36 disposed between the front and rear walls 18, 22 and the hopper chutes 20,24. As the magnet units 70 pass under the parts burden heaped within the housing and upon the face plate 36, none of the parts adjacent the entry position or intermediate that edge and the far edge or border of the burden will move under magnetic force, because of the weight of the mass upon the face plate. Not until the magnet unit 70 reaches the upper border or edge portion of the burden will the magnetic force effect movement of disengaged parts from the burden. The parts or units at that upper surface edge of the burden will then be picked up in single units or a few units and translated upon the surface plate 36 upwardly from the mass of parts until the parts reach the depending stop or discharge member 48. As the magnet unit 70, whose magnetic force has brought the parts to the stop, passes beyond it, the field of magnetic influence is diminished and drops substantially to zero, and the parts, no longer held upon the surface plate 36, drop by force of gravity upon the orienter, tray or other receiving means 25 therebelow, to be carried by gravity, mechanical or other means to another position. The drive chain mechanism 14 operates in some instances at about a speed of 40 feet per minute with seven magnet units 70. But this speed and the number of magnet units utilized are of course variable, depending upon the nature of the parts and the production requirements of the application.

The article feeding device 10 is so designed that the parts storage chamber within the housing 12 may be square, rectangular, circular, oval or of any suitable or desirable shape, depending upon the requirements of the application. Magnetic force is utilized as the basis of the machine translation function. The magnets 76,76 are of single backbar design, permanently charged and enclosed in the non-magnetic stainless steel housing or covering 80.

The end bearings 74,74, supporting the magnets 76,76, being rotatable upon the extended stub shafts 68,68 of the roller chain, permit slight lateral movement of the magnets so that jams of the link drive chain members are substantially prevented. The guide tracks 82,82 are so arranged to govern the pattern of movement of the magnet units 70 in their course in the housing, that the units 70 travel about and in close proximity to the lower support portion and the upper translation portion of the stationary non-magnetic stainless steel face plate 36. If the parts become linked together, the burden in chamber 35 causes the mass to resist any movement of the parts by magnetic force. When the parts are substantially discrete, they will not move until the magnets 76,76 begin to leave the region closely adjacent the upper border or edge of the burden adjacent the face or surface plate 36. At that point, the magnetic force will pick up one or a few of the parts from the border edge of the burden and translate them upon the surface of the stationary non-magnetic face plate 36 to the stop member 48.

Although a preferred embodiment of the article feeding device 10 has been illustrated and described for a substantially circular face plate with a complementary parts translation system, it will of course be understood that the configuration of the non-magnetic stainless steel face plate 36 may be of another configuration such as oval, rectangular, square, or in practically any other suitable or required configuration. The parts support and translation surface portions may be of any suitable practical width to meet the parts design and production requirements of varying applications.

It will of course be understood that the device of this invention is particularly suitable and adaptable only to magnetizable parts or units.

Although a particular preferred embodiment of the invention has been disclosed herein for purposes of explanation, further modifications or variations thereof, after study of this specification, will or may become apparent to those skilled in the art to which the invention pertains. Reference should be had to the appended claims in determining the scope of the invention.

I claim:

1. In article feeding apparatus for translating magnetizable parts charged into said apparatus, the improvement comprising in combination
    a housing having upper, lower and lateral wall members defining a partially enclosed chamber to receive said parts and hold them in a mass for unitary or plural translation therefrom,
    at least one said lateral wall member having an opening therethrough to admit said parts to said chamber and to pass said parts therefrom,
    a non-magnetic face plate for sliding translation of said parts thereon, disposed between two opposed facing lateral wall members and comprising a lower parts support surface portion and an upper parts translation surface portion having a segment thereof disposed in vertically spaced apart overlying relationship to said lower support portion,
    said upper translation surface portion segment having a parts stop member disposed adjacent thereto to limit further translation movement of said parts on and to cause said parts to fall by gravity from said segment adjacent said stop member,
    an endless magnetic-type parts translation mechanism in said housing,
    and power drive means operatively connected with said mechanism,
    said translation mechanism comprising
        endless drive means operatively actuated by said power drive means along a course in said housing, magnet means carried by said endless drive means in said course adjacent at least a segment of said lower support portion and adjacent said upper translation portion to and beyond said stop member,
    whereby said magnet means effectively removes one or a few at a time of said parts from said mass at an upper edge or border thereof and magnetically translates said part(s) therefrom on said translation surface portion to said stop member for release and discharge therefrom upon continued movement of said magnet means along said course beyond their sphere of magnetic influence on said parts.

2. The improvement defined in claim 1, wherein said housing further comprises
    front and rear walls having hopper chutes therein defining at least portions of the sides of said chamber and adapted to receive and retain said parts.

3. The improvement defined in claim 2, wherein said front and rear walls are provided with said openings therein above and in the area of said hopper chutes for admission of said parts to said chamber.

4. The improvement defined in claim 1, wherein said housing is further provided with side, bottom and top walls conjoined and secured to said front and rear walls, and forming a lubricant containing reservoir in the lower region of said housing.

5. The improvement defined in claim 4, wherein said housing is provided with lubricant inlet admission means and lubricant discharge drain means communicating with said lubricant reservoir.

6. The improvement defined in claim 1, wherein said power drive means comprises
    a motor-operated drive mechanism supported upon said housing and operatively connected to said translation mechanism.

7. The improvement defined in claim 1, wherein said lower and upper surface portions are disposed in a substantially arcuate configuration.

8. The improvement defined in claim 7, wherein at least a segment of said upper translation surface portion including said stop member is disposed in overlying relationship to said lower support surface portion.

9. The improvement defined in claim 3, wherein said face plate extends from and between said front and rear walls and outwardly of said openings therein.

10. The improvement defined in claim 1, wherein said lower and upper surface portions are contiguous.

11. The improvement defined in claim 6, wherein said endless drive means comprises
    duplex endless link chain drive members arranged in parallel spaced apart relationship,
    guide track means fixedly secured in said housing supporting said chain drive members in part and defining said course of movement relative to said face plate,
    drive sprocket means mounted on said housing walls, engaging said chain drive members and operatively actuated by said motor-operated drive mechanism,
    and said magnet means secured to and supported by said chain drive members therebetween and arranged to pass in said course adjacent and outwardly of said face plate surface portions.

12. The improvement defined in claim 1, wherein said face plate disposed outwardly of said opening, and said magnet means is carried outwardly of said face plate surface portions.

13. The improvement defined in claim 1, wherein said magnet means comprises a plurality of magnets arranged in spaced apart relationship longitudinally of said endless drive means.

14. The improvement defined in claim 11, wherein said magnet means are pivotally supported by said chain drive members.

15. The improvement defined in claim 1, wherein said magnet means comprises a plurality of unitary magnet members arranged in longitudinally spaced apart relationship upon said endless drive means and therebetween.

* * * * *